US012435391B2

(12) United States Patent
Kanauchi et al.

(10) Patent No.: US 12,435,391 B2
(45) Date of Patent: Oct. 7, 2025

(54) RESISTANCE ALLOY FOR USE IN SHUNT RESISTOR, USE OF RESISTANCE ALLOY IN SHUNT RESISTOR, AND SHUNT RESISTOR USING RESISTANCE ALLOY

(71) Applicant: KOA CORPORATION, Nagano (JP)

(72) Inventors: Naoki Kanauchi, Nagano (JP); Yoshitaka Kumeda, Nagano (JP); Tadahiko Yoshioka, Nagano (JP)

(73) Assignee: KOA Corporation, Nagano (JP)

( * ) Notice: Subject to any disclaimer, the term of this patent is extended or adjusted under 35 U.S.C. 154(b) by 359 days.

(21) Appl. No.: 18/019,755

(22) PCT Filed: May 20, 2021

(86) PCT No.: PCT/JP2021/019160
§ 371 (c)(1),
(2) Date: Feb. 3, 2023

(87) PCT Pub. No.: WO2022/030071
PCT Pub. Date: Feb. 10, 2022

(65) Prior Publication Data
US 2023/0287540 A1 Sep. 14, 2023

(30) Foreign Application Priority Data
Aug. 7, 2020 (JP) ................................ 2020-134314

(51) Int. Cl.
*C22C 9/05* (2006.01)
*H01C 7/00* (2006.01)

(52) U.S. Cl.
CPC ................ *C22C 9/05* (2013.01); *H01C 7/00* (2013.01)

(58) Field of Classification Search
CPC .................................. H01C 7/00; C22C 9/05
See application file for complete search history.

(56) References Cited

U.S. PATENT DOCUMENTS

| | | | | |
|---|---|---|---|---|
| 2022/0037064 A1* | 2/2022 | Ashida | ..................... | H01C 7/06 |
| 2023/0133344 A1* | 5/2023 | Kanauchi | ................. | H01C 1/14 420/487 |

FOREIGN PATENT DOCUMENTS

| | | | | |
|---|---|---|---|---|
| JP | 2007-329421 A | 12/2007 | | |
| JP | 2016-69724 A | 5/2016 | | |
| WO | 2016/111109 A1 | 7/2016 | | |
| WO | WO-2019244842 * | 12/2019 | .............. | C22C 9/05 |

OTHER PUBLICATIONS

WO-2019244842 translation (Year: 2019).*
International Search Report (PCT/ISA/210) (Japanese) of PCT/JP2021/019160, 3 pgs. See a translation identified as B2.
English translation of International Search Report (PCT/ISA/210) of PCT/JP2021/019160, 3 pgs.
Written of Opinion (PCT/ISA/237) of PCT/JP2021/019160 (Japanese), 4 pgs. See a translation identified as B4.
English translation of Written Opinion (PCT/ISA/237) of PCT/JP2021/019160, 4 pgs.

* cited by examiner

*Primary Examiner* — Kyung S Lee
(74) *Attorney, Agent, or Firm* — Crowell & Moring LLP

(57) ABSTRACT

Provided is a resistance alloy enabling a decrease in the TCR of a shunt resistor for use in a current detection device capable of detecting large currents. A copper-manganese based resistance alloy for use in a shunt resistor further comprises tin and nickel and has a TCR less than or equal to $-36\times10^{-6}$/K at 100° C. with reference to 25° C.

5 Claims, 9 Drawing Sheets

RESISTANCE ALLOY FOR USE IN SHUNT RESISTOR, USE OF RESISTANCE ALLOY IN SHUNT RESISTOR, AND SHUNT RESISTOR USING RESISTANCE ALLOY

CROSS-REFERENCE TO RELATED APPLICATIONS

The application is a 371 application of PCT/JP2021/019160 having an international filing date of May 20, 2021, which claims priority to JP 2020-134314 filed Aug. 7, 2020, the entire content of each of which is incorporated herein by reference.

TECHNICAL FIELD

The present invention relates to a resistance alloy for use in a shunt resistor, use of a resistance alloy in a shunt resistor, and a shunt resistor using a resistance alloy.

BACKGROUND ART

Examples of resistance alloys for resistors used for current detection and the like include copper-manganese based alloys, copper-nickel based alloys, nickel-chromium based alloys, iron-chromium based alloys, etc. As general copper-manganese based alloys (copper-manganese-nickel based alloys), those with a specific resistance of 29 μΩ·cm to 50 μΩ·cm, inclusive, are commercially available. With regard to nickel-chromium-aluminum-copper alloys, those with a specific resistance greater than or equal to 120 μΩ·cm are commercially available (see Patent Literature 1, for example).

Generally, the temperature coefficient of resistance (TCR) of a resistance alloy used for current detection is designed to have a target value of around 0 ppm/K at 20-100° C. With such resistance material, it is possible to obtain a stable current detection accuracy even if the temperature condition is changed.

PATENT LITERATURE

Patent Literature 1: JP 2007-329421 A

SUMMARY OF INVENTION

Technical Problem

In recent years, there has been a demand for using a current detection resistor for detecting large currents, such as on the order of 1000 A. To address such demand, the resistance value of shunt resistors has been progressively reduced to 100μΩ, 50μΩ, 25μΩ, and 10μΩ, for example.

When a shunt resistor (current detection resistor) is constructed using the resistance alloy, copper electrodes are welded to both ends of a resistive body. Copper has a high TCR of about 4,000 ppm/K (25 to 100° C.). If the shunt resistor is reduced in size or resistance, the percentage of contribution of the TCR of the copper electrodes to the resistance value of the shunt resistor increases. Consequently, the TCR of the shunt resistor increases and the current detection accuracy decreases.

Patent Literature 1 discloses techniques for adjusting the TCR by means of the shape of the resistor. However, processing the electrodes introduces the issue of an increase in the actual resistance of the resistor. Another issue is that it is difficult to perform processing or adjustment when the resistor is reduced in size.

In addition, when the shunt resistor is reduced in resistance and size, another issue is that the TCR of the resistor increases and the detection accuracy decreases. There is also the need to ensure the reliability of the current detection device.

Further, depending on the product specifications, the thickness and width of the shunt resistor may be fixed. In such cases, in order to decrease the resistance value of the resistor, it is necessary to reduce the length of the resistive body to reduce resistance. However, if the resistive body and the electrodes are to be welded by electron beam welding or the like, the width of weld marks needs to be considered. Accordingly, the process of reducing the length of the resistive body is limited by processing dimensions.

It is an object of the present invention to provide a resistance alloy that enables a decrease in the TCR of a shunt resistor used in a current detection device capable of detecting large currents.

Solution to Problem

According to an aspect of the present invention, there is provided a copper-manganese based resistance alloy for use in a shunt resistor, the resistance alloy further including tin and nickel and having a TCR less than or equal to $-36\times10^{-6}$/K at 100° C. with reference to 25° C.

The present invention also provides a copper-manganese based resistance alloy for use in a shunt resistor, the resistance alloy further including tin and nickel and having a TCR less than or equal to $-10\times10^{-6}$/K in a range of 0° C. to 175° C. with reference to 25° C.

The above may include 9.5 to 12.5 mass % of manganese, 1 to 3 mass % of nickel, 2.5 to 5 mass % of tin, and a balance being copper.

In this way, the TCR value of a shunt resistor formed with a copper electrode, for example, can be reduced.

The present invention also provides use of the resistance alloy according to any one of the above in a resistive body of a shunt resistor for use in a current detection device.

The present invention also provides a shunt resistor including a resistive body and an electrode. The resistive body is formed of a copper-manganese based resistance alloy, the resistance alloy further including tin and nickel and having a TCR of less than or equal to $-36\times10^{-6}$/K at 100° C. with reference to 25° C.

The present invention also provides a shunt resistor including a resistive body and an electrode. The resistive body is formed of a copper-manganese based resistance alloy, the resistance alloy further including tin and nickel and having a TCR less than or equal to $-10\times10^{-6}$/K in a range of 0° C. to 175° C. with reference to 25° C.

The present description includes the contents disclosed in JP Patent Application No. 2020-134314, based on which the present application claims priority.

Advantageous Effects of Invention

According to the present invention, it is possible to reduce the TCR of a shunt resistor used in a current detection device capable of detecting large currents.

Further, according to the present invention, it is possible to ensure the current detection reliability of the shunt resistor.

BRIEF DESCRIPTION OF DRAWINGS

FIG. 4B indicates the dimensions (mm) of the element.

DESCRIPTION OF EMBODIMENTS

In the following, resistance alloys for use in shunt resistors according to the embodiments of the present invention, and shunt resistors using the same, for example, will be described with reference to the drawings.

First, the inventors' considerations concerning the present invention will be explained.

1) As the focus of the inventors, it is important to use a resistance alloy that shows a negative TCR in the resistive body, to compensate for the contribution of the large positive TCR of copper used in the electrodes. However, there are few reports concerning resistance alloys having a large negative TCR.
2) While copper-nickel alloys having a low TCR and excellent long-term stability are present, such alloys have a large thermal electromotive force of 40 μV/K with respect to copper. Thus, in a shunt resistor used in a current detection device with large current flows, the detection accuracy decreases due to the Peltier effect.
3) As an example of an alloy having a negative TCR, there is a nickel-chromium based alloy. However, the nickel-chromium based alloy has a volume resistivity greater than or equal to two-fold compared to copper-nickel alloys and copper-manganese alloys. Accordingly, it is difficult to achieve a reduced resistance of the shunt resistor.

The embodiments are based on the conception that the TCR of a resistor can be decreased by providing a resistive body with a negative TCR. That is, it is important to explore resistive bodies having a negative TCR.

First Embodiment

In the following, an embodiment of the present invention will be described.

The alloy according to the present embodiment is a resistance alloy having a negative TCR, and is a quaternary alloy composed of copper-manganese-nickel-tin. The resistance alloy can be used as the resistance material of the shunt resistor.

Figure 1:
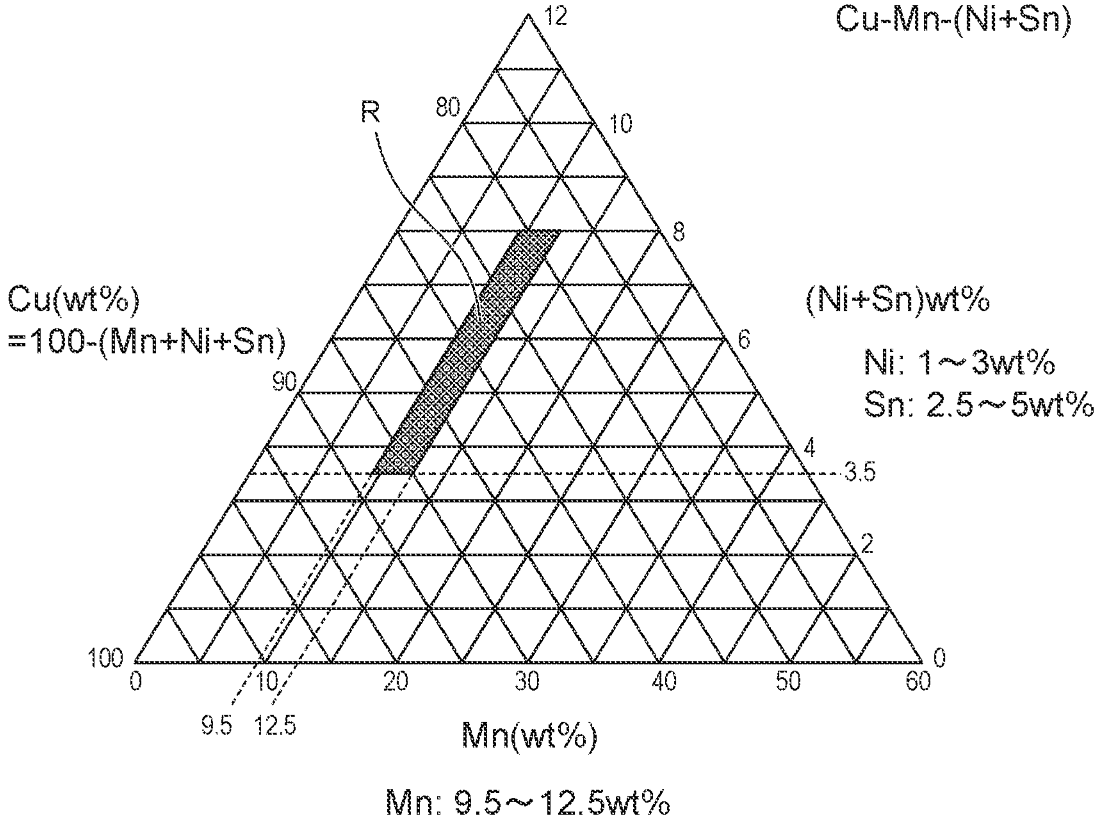
FIG. 1 is a phase diagram of a quaternary alloy of an alloy for a resistive body including copper and manganese-tin-nickel according to the present embodiment.

FIG. 1 is a phase diagram of a quaternary alloy of an alloy for a resistive body containing copper and manganese-tin-nickel according to the present embodiment.

Herein, the mass fraction of copper is shown on the axis on the upper-left side, and the mass fraction of nickel+tin is shown on the axis on the upper-right side. Meanwhile, the mass fraction of manganese is shown on the axis on the bottom side.

FIG. 1 shows a filled region R characterizing the resistance alloy according to the present invention. In the region R, the mass fraction of manganese is 9.5% to 12.5%. In the region R, the mass fraction of nickel+tin is 3.5% to 8%. More specifically, nickel has a mass fraction of 1% to 3%, and tin has a mass fraction of 2.5% to 5%. The balance is copper.

A representative value of manganese is 10.5 mass %. A representative value of nickel is 2.0 mass %. A representative value of tin is 3 mass %. The balance is copper.

Figure 2:
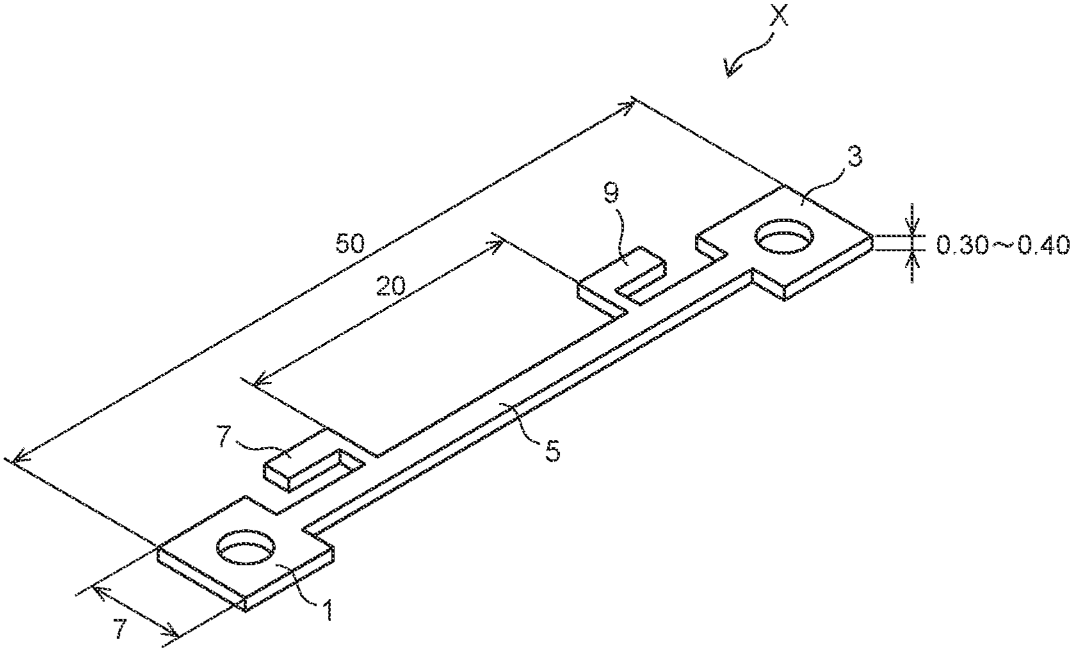
FIG. 2 illustrates the shape of an evaluation sample for an alloy for a resistor according to an embodiment of the present invention.

FIG. 2 illustrates the shape of an evaluation sample for the alloy for the resistor according to the embodiment of the present invention.

As illustrated in FIG. 2, the evaluation sample X for the alloy for the resistor includes electrode portions (through which current flows) 1, 3 at both ends; a resistive body 5 extending between the electrode portions 1, 3; and voltage detecting portions 7, 9 which are positioned closer to the center than the ends of the resistive body 5 are. The distance between the electrode portions 1, 3 is 50 mm. The distance between the voltage detecting portions 7, 9 is 20 mm.

Next, an example of an evaluation sample manufacturing process will be briefly described:

1) Raw materials are weighed.
2) The materials of 1) are dissolved.
3) Using a cold rolling mill, a hoop material of a predetermined thickness is obtained.
4) In a vacuum gas replacement furnace, heat treatment is performed in an N2 atmosphere at 500 to 700° C. for 1 to 2 hours.
5) From the hoop material, a resistive body sample with the shape shown in FIG. 2 is prepared by pressing.
6) In the vacuum gas replacement furnace, heat treatment (low temperature heat treatment) is performed in an N2 atmosphere at 200 to 400° C. for 1 to 4 hours.

The mass fraction of each of the alloy components in the region R is adjusted with respect to each other such that the resistance alloy has the following characteristics (appropriate conditions).

(Appropriate Conditions)

1) The specific resistance is greater than or equal to 41 μΩ·cm and less than or equal to 54 μΩ·cm.
2) The TCR with reference to 25° C. is less than or equal to $-36\times10^{-6}$/K at 100° C. Further, with reference to 25° C., the TCR is less than or equal to $-25\times10^{-6}$/K at 60°

C. Further, with reference to 25° C., the TCR is less than or equal to $-10\times10^{-6}$/K in a range of 0° C. to 175° C.

3) The resistance alloy has a thermal electromotive force with respect to copper of −1 μV/K to +1 μV/K. This characteristic is about 1/40 that of a Cu—Ni based alloy and is a value of the same order as that of Manganin®.

(Effects Based on Resistance Alloy in Accordance with Appropriate Conditions)

Using the resistance alloy according to the present embodiment provides the following effects:

1) The TCR of a shunt resistor having electrodes using a copper-containing material can be reduced.

2) The rate of change in resistance value in a shunt resistor reliability test (heating temperature 175° C., heating time 1000 hr) is smaller than that of Manganin®, providing superior long-term stability.

3) The alloy has a smaller Vickers hardness (less than or equal to 200 HV) than a nickel-chromium alloy and an iron-chromium alloy, and is easy to process. If the Vickers hardness is greater than 200 HV, cracking may occur during rolling, for example. Preventing this may require implementing measures such as heat treatment and may complicate the process; however, the present embodiment does not require such heat treatment. In view of processability, the Vickers hardness is more preferably less than or equal to 150 HV. From the viewpoint of pressing characteristic, mechanical strength and the like, it is preferable that the Vickers hardness be less than or equal to 150 HV.

(Detailed Description of Resistance Alloy Samples)

Various samples were prepared, as indicated below.

The characteristics of the samples are shown in Table 1 and Table 2.

composition of the present embodiment (excluded samples). In addition, as Comparative Examples 1, 2, examples are shown that are commercially available and in which base materials of compositions different from the present examples are used.

The heat treatment conditions when the various samples shown in Table 1 were generated is 600° C. for 1 hour. By performing the heat treatment at the temperature of 600° C. or higher and for approximately 1 hour, the alloy according to the present embodiment can be recrystallized. Alternatively, heat treatment may be performed at the heat treatment temperature of 700° C. for a few minutes to achieve recrystallization. By the recrystallization of the various samples, it is possible to obtain good hardness and achieve the target value of the TCR characteristics of the present application, as will be described below with reference to Table 2. In addition, a resistance alloy having excellent long-term stability can be obtained.

In cases where the heat treatment temperature is less than about 600° C., such as a case where the heat treatment temperature is about 400° C., for example, the Vickers hardness becomes greater than 150 HV. Preferably, the Vickers hardness is less than or equal to 150 HV. All of the alloy materials (samples) indicated in the present embodiment satisfy the appropriate condition for the Vickers hardness of less than or equal to 150 HV.

With regard to the specific resistance of the resistance material, values comparable to those of Comparative Examples 1, 2, which are commercially available materials, are obtained for all of the samples. With regard to the thermal electromotive force with respect to copper, the values are within the range of −1 μV/K to +1 μV/K and satisfy the appropriate condition. Samples No. 9 and No. 10 are outside the range (excluded samples). The other samples satisfy this condition.

TABLE 1

| Sample No. | Component [mass %] | Heat treatment temperature [° C.] | Vickers hardness [HV] | Specific resistance [μΩ · cm] | Thermal electromotive force with respect to copper (100° C./0° C.) [μV/K] | Processability |
|---|---|---|---|---|---|---|
| 1 | Cu—10.5Mn—2.5Ni—3Sn | 600 | 110 | 43 | −0.39 | ○ |
| 2※ | Cu—12.5Mn—2.5Ni—1Sn | 600 | 101 | 47 | 0.30 | ○ |
| 3 | Cu—12.5Mn—2.5Ni—3Sn | 600 | 115 | 50 | 0.23 | ○ |
| 4 | Cu—12.5Mn—2.5Ni—5Sn | 600 | 118 | 54 | 0.08 | Δ |
| 5※ | Cu—10.5Mn—2.5Ni | 600 | 97 | 38 | 0.05 | ○ |
| 6※ | Cu—11.5Mn—2.5Ni | 600 | 99 | 41 | 0.14 | ○ |
| 7※ | Cu—8.5Mn—2.5Ni—7.0Sn | 600 | — | — | — | x |
| 8 | Cu—9.5Mn—2.5Ni—5.0Sn | 600 | 111 | 43 | −0.51 | Δ |
| 9※ | Cu—10.5Mn—3.0Sn | 600 | 116 | 42 | 1.02 | Δ |
| 10※ | Cu—10.5Mn—5.0Ni—3.0Sn | 600 | 107 | 43 | −1.22 | ○ |
| 11 | Cu—10Mn—2.5Ni—3.0Sn | 600 | 130 | 41 | −0.31 | ○ |
| 12 | Cu—10.5Mn—2.5Ni—2.5Sn | 600 | 120 | 41 | 0.01 | ○ |
| 13 | Cu—10.5Mn—3Ni—3Sn | 600 | 123 | 43 | −0.49 | ○ |
| 14 | Cu—10.5Mn—2.0Ni—3.0Sn | 600 | 113 | 43 | 0.02 | ○ |
| Comparative example1 | Cu—12.5Mn—2.5Ni | 600 | 101 | 44 | 0.39 | ○ |
| Comparative example2 | Cu—45Ni | 600 | 95 | 49 | −39 | ○ |

Samples with "※" are outside the embodiment of the present invention (excluded samples).
Comparative Examples 1 and 2 are different commercially available materials.

Table 1 shows the composition/component (mass %), heat treatment temperature, Vickers hardness, specific resistance, thermal electromotive force with respect to copper, and the result of determination of processability ("o" indicates it is appropriate) of the alloy materials of sample numbers 1 to 14. Note that the composition may include unavoidable impurities. The samples with "X" are those outside the Evaluation of processability refers to an evaluation in a case where, in particular, rolling is performed. The "○" indicates examples where good processing was performed; "Δ" indicates samples in which slight cracks were visible but that were practicable; "x" indicates difficulty in rolling. With regard to Sample No. 7, no practicable processability was obtained. With regard to the other samples, practicable processability was obtained, although with varying levels.

TABLE 2

| Sample No. | TCR (25° C.-0° C.) [×10^-6/K] | TCR (25° C.-40° C.) [×10^-6/K] | TCR (25° C.-60° C.) [×10^-6/K] | TCR (25° C.-100° C.) [×10^-6/K] | TCR (25° C.-175° C.) [×10^-6/K] |
|---|---|---|---|---|---|
| 1 | −16 | −32 | −37 | −44 | −52 |
| 2※ | 6 | −16 | −25 | −39 | −55 |
| 3 | −19 | −32 | −40 | −49 | −63 |
| 4 | −30 | −44 | −50 | −61 | −71 |
| 5※ | 33 | 12 | 5 | −6 | −19 |
| 6※ | 30 | 9 | −1 | −14 | −30 |
| 7※ | — | — | — | — | — |
| 8 | −16 | −26 | −29 | −36 | −42 |
| 9 | −15 | −30 | −37 | −46 | −56 |
| 10※ | 39 | 22 | 19 | 6 | −16 |
| 11 | −14 | −26 | −31 | −39 | −46 |
| 12 | −12 | −25 | −31 | −39 | −48 |
| 13 | −10 | −26 | −31 | −38 | −49 |
| 14 | −18 | −34 | −39 | −46 | −55 |
| Comparative example 1 | 30 | 8 | −1 | −18 | −37 |
| Comparative example2 | −13 | −15 | −17 | −18 | −19 |

Samples with "※" are outside the embodiment of the present invention (excluded samples).

Table 2 shows the TCR values of the various samples (resistance alloy materials) shown in Table 1. With the reference temperature at 25° C., the TCR under each of the measurement temperature conditions shown in Table 2 was determined. The Sample Nos. of Table 2 correspond to the Sample Nos. of Table 1.

From the data shown in Table 2, the following can be learned.

1) Sn-Content Dependency

Samples No. 5 and No. 6 do not contain Sn. In the case of alloy materials that do not contain Sn, the TCR tends to be on the positive side.

On the other hand, when the alloy contains Sn in a predetermined range, as in Samples No. 1, No. 3, and No. 4, the TCR can be shifted to the negative side. Thus, in order to obtain a negative TCR, it is effective to add Sn. Meanwhile, Sample No. 2 has less Sn (1.0 mass %) than the other samples containing Sn. Sample No. 7 contains more Sn (7.0 mass %) than the other samples containing Sn. In the case of Sample No. 7, processability decreases, as shown in Table 1, and the TCR was unable to be measured.

2) Ni-Content Dependency

While Sample No. 10 contains Sn in the predetermined range, and while processability in terms of rolling, for example, is improved due to a large Ni content, the TCR is positive. Sample No. 9 does not contain Ni, has a slightly increased thermal electromotive force with respect to copper, and has a slightly reduced processability. Sample No. 4 also has a slightly degraded processability.

Sample No. 9 has a large thermal electromotive force with respect to copper compared to the other samples containing Ni. Thus, it can be seen that Ni has an effect of reducing the thermal electromotive force with respect to copper.

In view of the foregoing results, Sample No. 2 (having less Sn than the predetermined value), No. 5 and No. 6 (containing no Sn), and No. 10 (having greater Ni than the predetermined value) have their TCRs on the positive side, and are therefore excluded from the samples enabling the achievement of the purpose of the present invention. Sample No. 7 (having more Sn than the predetermined value) has poor processability and is excluded from the samples enabling the achievement of the purpose of the present invention. No. 9 has a greater thermal electromotive force with respect to copper than the predetermined value and is therefore excluded.

The foregoing results taken together, Samples No. 1, No. 3, No. 11, No. 12, No. 13, and No. 14 may be cited as the more preferable alloy resistance materials.

(Summary of Alloy Characteristics)

Summarizing the foregoing results, as the alloy that is the resistance material of the shunt resistor of the present embodiment, as shown in the region R of FIG. 1, the mass fraction of manganese is 9.5% to 12.5%, and the mass fraction of nickel+tin in the region R is 3.5% to 8%. More specifically, nickel has a mass fraction of 1% to 3%, tin has a mass fraction of 2.5% to 5%, and the balance is copper.

(Results of Reliability Test)

Figure 3:
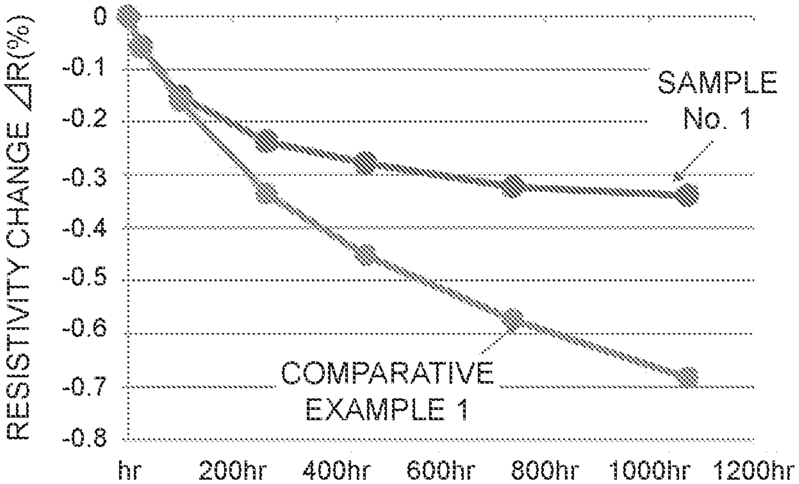
FIG. 3 illustrates the results of performing a long-term stability (reliability) test with respect to Sample No. 1 and Comparative Example 1 in Tables 1 and 2.

FIG. 3 illustrates the results of a long-term reliability test performed with respect to Sample No. 1 and Comparative Example 1. In the long-term reliability test, a resistance value change ΔR (%) under conditions of 175° C. for 1000 hours was measured. As illustrated in FIG. 3, while the resistance value change after the elapse of 1000 hours was about −0.3% with respect to Sample No. 1, it was about −0.7% for Comparative Example 1 (commercially available material). This indicates that the resistance material (for example, Sample No. 1) using the alloy material according to the present embodiment has excellent long-term reliability.

As described above, by using the alloy for a resistive body according to the present embodiment, it is possible to provide a resistance alloy achieving a specific resistance of about 41 to 55 μΩ·cm and having improved processability compared to nickel-chromium alloys and iron-chromium based alloys.

When a shunt resistor is designed using a resistance material having a relatively low specific resistance, to fabricate a shunt resistor on the high resistance side may pose design limitations, such as requiring the thinning of the resistive body or necessitating a length of the resistive body. However, according to the present embodiment, by using the resistive body having a relatively high specific resistance, freedom of design of the shunt resistor can be ensured.

Further, by using the resistance alloy having a relatively high specific resistance, it is possible to reduce the contribution of the TCR of Cu used in the electrodes relative to the entire resistor. Thus, a shunt resistor taking advantage of the characteristics of the resistance alloy can be provided.

Further, it can be seen that the alloy for a resistive body according to the present embodiment has excellent long-term reliability.

Second Embodiment

Figure 4A:
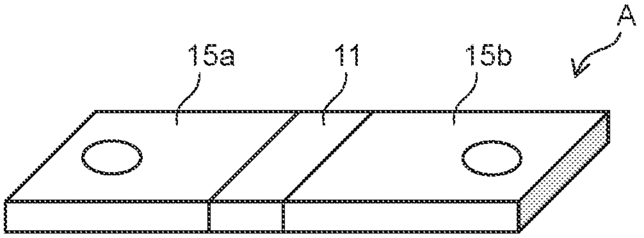
FIG. 4A is a perspective view of a configuration example of a shunt resistor in which an alloy for a resistor according to a first embodiment of the present invention is used.
Figure 4B:
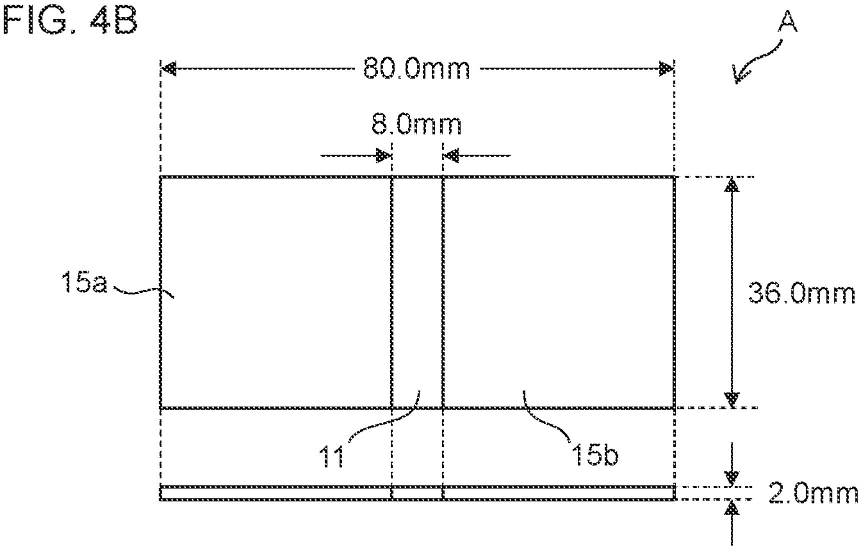
FIG. 4B shows a plan view and a side view of the shunt resistor.

A second embodiment of the present invention will be described. FIG. 4A is a perspective view of a configuration example of a shunt resistor using the alloy for the resistor according to the first embodiment of the present invention. FIG. 4B shows a plan view and a side view of the shunt resistor. In FIG. 4B, dimensions (mm) are shown.

The shunt resistor A illustrated in FIGS. 4A and 4B have a structure obtained by preparing a single unitary piece of a resistive body 11 by pressing and the like, and then butt-welding Cu electrodes 15*a*, 15*b* onto the ends thereof.

The resistive body 11 and the electrodes 15*a*, 15*b* may be joined by electron beam (EB) welding, laser beam (LB) welding, and the like. The shunt resistor A illustrated in FIGS. 4A and 4B is a relatively large shunt resistor, and may be made one by one. The material of the resistive body may be the one described with reference to the first embodiment, including 9.5 to 12.5 mass % of manganese, 1 to 3 mass % of nickel, 2.5 to 5 mass % of tin, and the balance being copper. Other alloys described in the first embodiment may be used depending on the purpose.

In the shunt resistor according to the present embodiment, freedom of design of the shunt resistor can be ensured by using a resistive body having a relatively high specific resistance.

Further, by using the resistance alloy having a relatively high specific resistance, the contribution of the TCR of Cu used in the electrodes relative to the entire resistor can be reduced. Accordingly, a shunt resistor taking advantage of the characteristics of the resistance alloy can be provided.

Here, in the present embodiment, the temperature coefficient of resistance of the resistance material is adjusted to be on the negative side. Thus, the temperature coefficient of resistance of the resistor to which the copper electrodes have been joined can be reduced.

For the shunt resistor A structured and dimensioned as illustrated in FIG. 4B, the TCR was measured. For the shunt resistor in which Comparative Example 1 was used as the resistance material, the TCR was 76 ppm/K. On the other hand, for the shunt resistor in which Sample No. 1 was used, the TCR was 50 ppm/K. Thus, it can be seen that the TCR is improved toward zero when the resistance alloy of the present embodiment is used.

Third Embodiment

A third embodiment of the present invention will be described. This is an example of manufacture in which an elongated joined material comprising a resistive body and electrodes joined together is prepared and then punched and cut. In this way, it is possible to mass-produce relatively small shunt resistors.

In the following, an example of such manufacturing process is described. FIG. 5A to FIG. 5F illustrate an example of the manufacturing process for the shunt resistor according to the present embodiment.

Figure 5A:
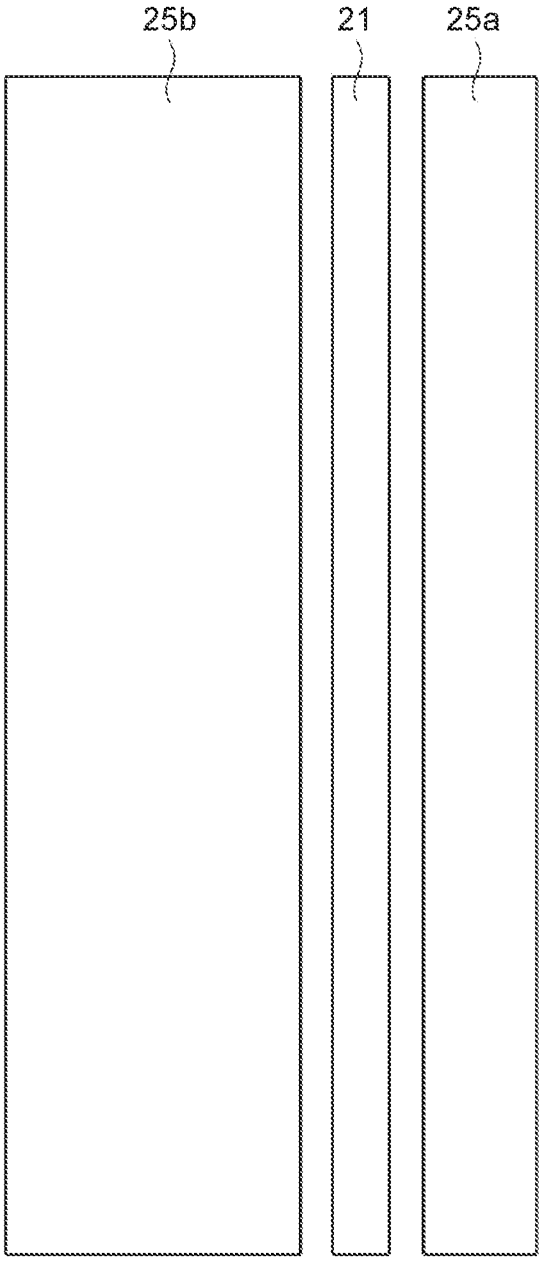
FIG. 5A illustrates an example of a manufacturing step for a shunt resistor according to a third embodiment of the present invention.

As illustrated in FIG. 5A, for example, an elongated resistance material 21 of a flat plate-like shape, and a first electrode material 25*a* and a second electrode material 25*b* of an elongated flat plate-like shape similar to the resistance material 21 are prepared. For the resistance material 21, the alloy material described in the first or second embodiment is used.

Figure 5B:
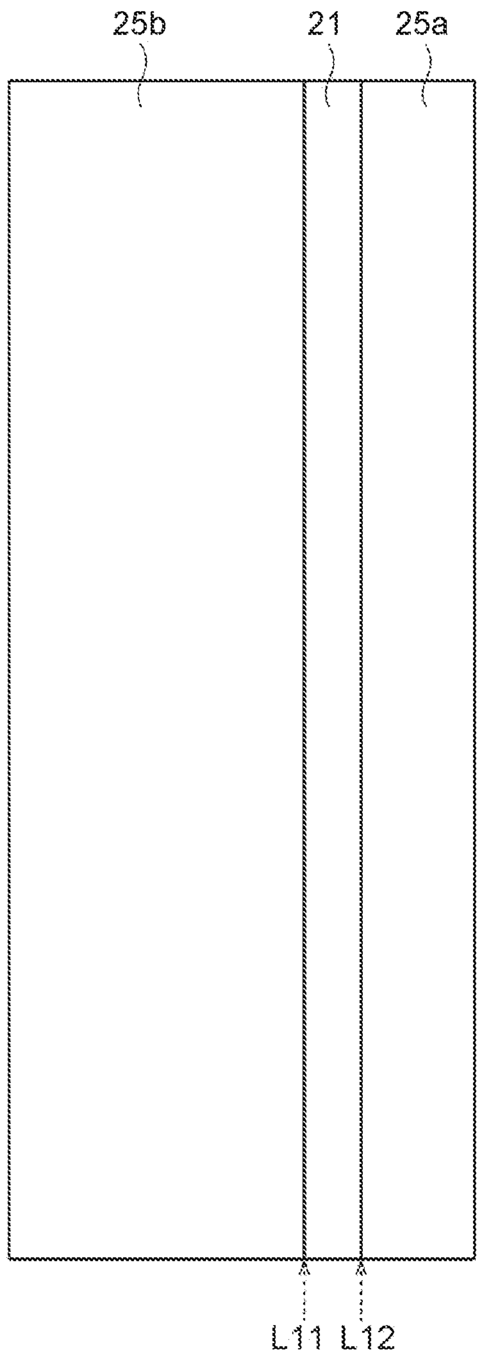
FIG. 5B illustrates an example of a manufacturing step for the shunt resistor according to the third embodiment of the present invention, continuing from FIG. 5A.

As illustrated in FIG. 5B, the first electrode material 25*a* and the second electrode material 25*b* are arranged on both sides of the resistance material 21.

Figure 5C:
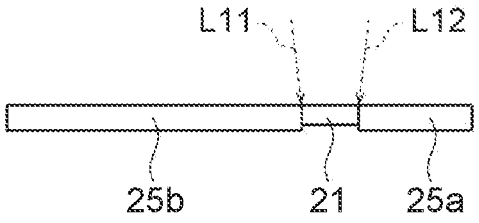
FIGS. 5CA and 5CB illustrate an example of a manufacturing step for the shunt resistor according to the third embodiment of the present invention, continuing from FIG. 5B.
Figure 5C:
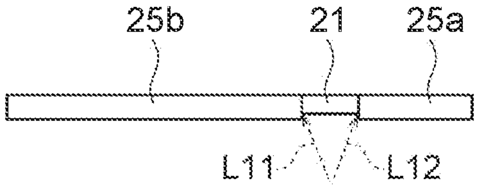

As illustrated in FIGS. 5CA and 5CB, welding is performed using an electron beam, a laser beam or the like to obtain a single piece of flat plate (joined at L11 and L12). Specifically, the electron beam or the like irradiates locations illustrated in FIG. 5CA or FIG. 5CB. FIG. 5CA is an example in which the electron beam or the like irradiates a flat surface side of the electrode materials 25*a*, 25*b* and the resistive body 21. FIG. 5CB is an example in which the electron beam or the like irradiates the inside of a recess formed by the electrode materials 25*a*, 25*b* and the resistive body 21. The surfaces of the electrode materials 25*a*, 25*b* protruding beyond the resistive body 21 are prevented from being irradiated with the electron beam or the like so as to be less affected.

The resistance value may be adjusted by the difference in thickness of the resistance material 21 and the electrode materials 25*a*, 25*b*. Further, a step ($\Delta h_2$) may be formed, as will be described below with reference to FIG. 5F. It is also possible to make various adjustments regarding the resistance value and shape by means of the joining position.

Figure 5D:
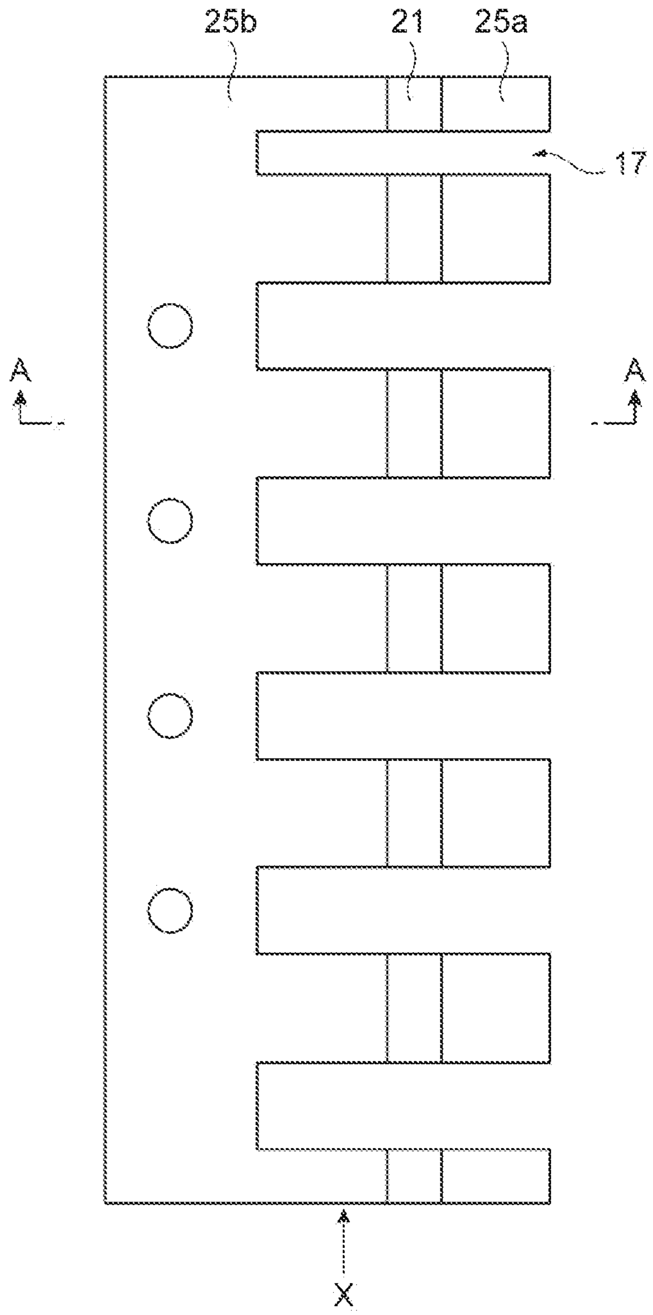
FIGS. 5DA and 5DB illustrate an example of a manufacturing step for the shunt resistor according to the third embodiment of the present invention, continuing from FIGS. 5CA and 5CB.
Figure 5D:
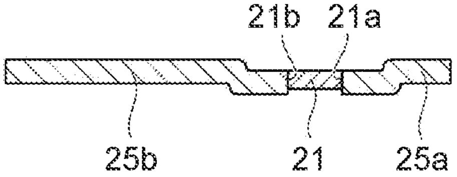

Next, as illustrated in FIG. 5DA, from the state of FIG. 5B, the flat plate including the region of the resistive body 21 is punched out in a comb shape, as indicated at sign 17. Then, the first electrode material 25*a* and the second electrode material 25*b* are partly bent by pressing or the like, forming a structure with a cross sectional shape shown in the cross-sectional view of FIG. 5DB. Signs 21*a*, 21*b* indicate welded portions where connections are made by electron beam irradiation or the like.

Figure 5E:
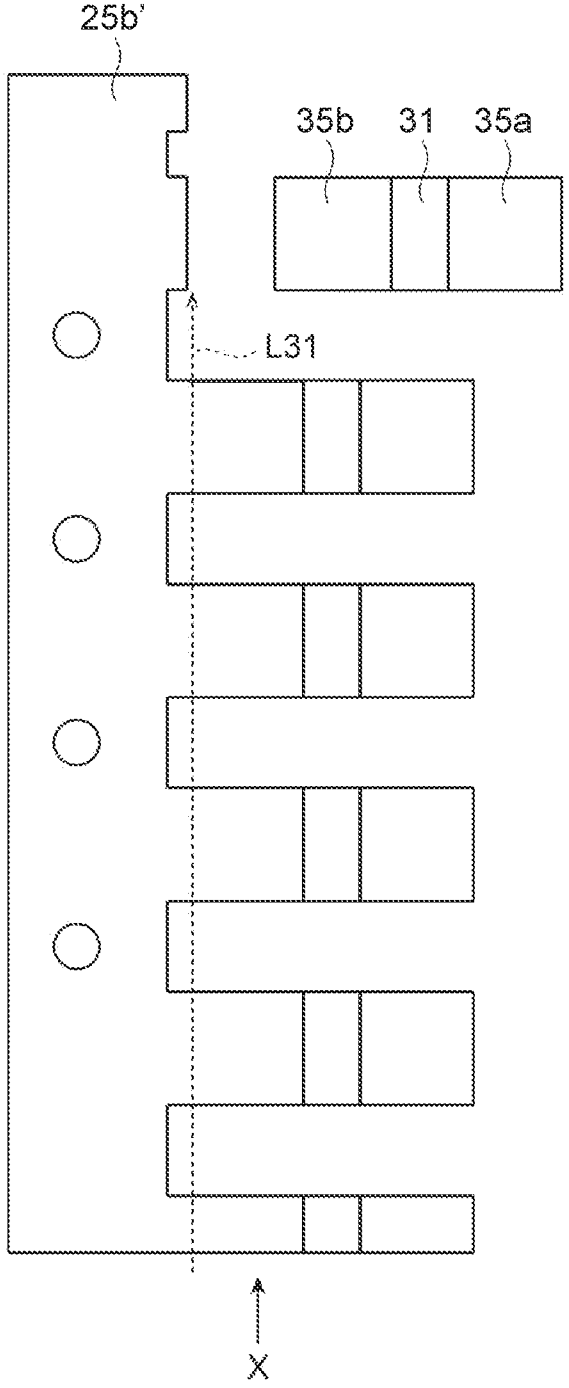
FIG. 5E illustrates an example of a manufacturing step for the shunt resistor according to the third embodiment of the present invention, continuing from FIGS. 5DA and 5DB.

Then, as illustrated in FIG. 5E, another end side (35*b*) on which the electrode is not cut off is cut off from a remaining region (base portion) 25*b*' along L31. A resistor of butted structure for use in the current detection device according to the first embodiment can be formed. The manufacturing method according to the present embodiment provides the advantage that the resistor composed of electrodes 35*a*, 35*b* and a resistive body 31 can be mass-produced.

Figure 5F:
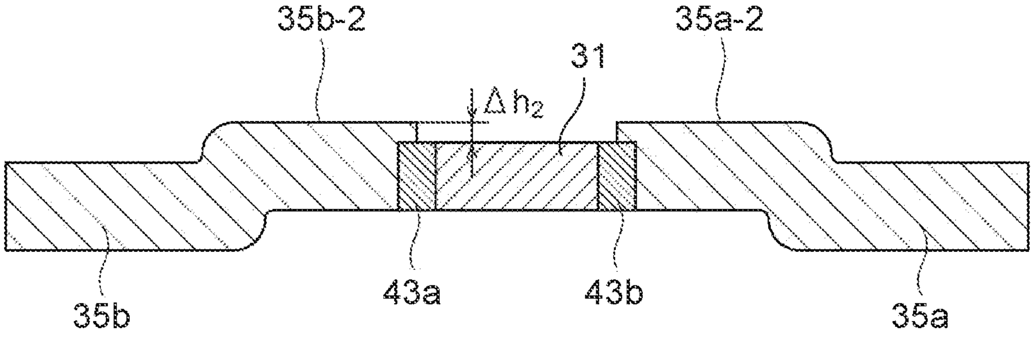
FIG. 5F illustrates an example of a manufacturing step for the shunt resistor according to the third embodiment of the present invention, continuing from FIG. 5E.

Note that, as illustrated in FIG. 5F, the resistor has weld marks 43*a*, 43*b* formed thereon. Generally, the surface of weld marks by an electron beam or the like is in a coarse state. While it is preferable to affix bonding wires as close to the resistive body as possible for precise current detection, the weld marks can get in the way. According to the present example, the formation of such weld marks on regions 35*a*-2, 35*b*-2 that form bonding surfaces can be avoided by the method described with reference to FIGS. 5CA and 5CB. Thus, the advantage of being able to affix wires close to the resistive body can be obtained.

In the shunt resistor according to the present embodiment, because of the use of the resistive body having a relatively high specific resistance, freedom of design of the shunt resistor can be ensured.

Further, with the use of the resistance alloy having a relatively high specific resistance, the contribution of the TCR of Cu used in the electrodes relative to the entire resistor can be reduced. Accordingly, a shunt resistor taking advantage of the characteristics of the resistance alloy can be provided.

Further, the shunt resistance material according to the present embodiment provides good processability during rolling for manufacturing the resistance material or pressing for manufacturing the resistor, for example.

While the above features are maintained, a negative TCR value can be obtained and the TCR of the resistor including the copper electrodes can be reduced.

SUMMARY

The following summarizes the present invention.

1) A resistance alloy can be used that has a manganese composition of 9.5 to 12.5 mass % (representative value: 10.5 mass %), 1 to 3 mass % (representative value: 2.5 mass %) of nickel, 2.5 to 5 mass % (representative value: 3%) of tin, and the balance being copper.

2) Preferably, the TCR is less than or equal to $-25\times10^{-6}$ at 60° C. with reference to 25° C. By thus making the TCR negative as a fundamental specification of the resistance material, good resistor characteristics can be obtained. In this case, the TCR of the resistive body is preferably greater than or equal to $-52\times10^{-6}$/K.

3) Preferably, the TCR is a value less than or equal to $-10\times10^{-6}$/K in a range of 0° C. to 175° C. with reference to 25° C. In this way, a negative TCR can be obtained in the temperature ranges of all regions that are mainly used. Accordingly, an improvement in TCR characteristics can be achieved in all temperature ranges used in the shunt resistor. In this case, the TCR is preferably greater than or equal to $-75\times10^{-6}$/K.

4) The TCR is less than or equal to $-36\times10^{-6}$/K at 100° C. with reference to 25° C. In this case, the TCR is preferably greater than or equal to $-65\times1^{-6}$/K.

In the foregoing embodiments, the illustrated configurations and the like are not limiting and may be modified, as appropriate, within a range in which the effects of the present invention can be obtained. Other modifications may also be made and implemented without departing from the scope of the purpose of the present invention.

The constituent elements of the present invention may be optionally selectively added or omitted, and an invention having an optionally selectively added or omitted configuration is also included in the present invention.

INDUSTRIAL APPLICABILITY

The present invention may be utilized as an alloy for a resistor.

All publications, patents and patent applications cited in the present description are incorporated herein by reference in their entirety.

The invention claimed is:

1. A copper-manganese based resistance alloy for use in a shunt resistor, the resistance alloy comprising 9.5 to 12.5 mass % of manganese, 2.5 to 5 mass % of tin, 1 to 3 mass % of nickel, and a balance of the resistance alloy being copper, wherein the resistance alloy has a TCR less than or equal to $-36\times10^{-6}$/K at 100° C. with reference to 25° C.

2. A copper-manganese based resistance alloy for use in a shunt resistor, the resistance alloy comprising 9.5 to 12.5 mass % of manganese, 2.5 to 5 mass % of tin, 1 to 3 mass % of nickel, and a balance of the resistance alloy being copper, wherein the resistance alloy has a TCR less than or equal to $-10\times10^{-6}$/K in a range of 0° C. to 175° C. with reference to 25° C.

3. Use of the resistance alloy according to any one of claims 1 to 2 in a resistive body of a shunt resistor for use in a current detection device.

4. A shunt resistor comprising a resistive body and an electrode, wherein the resistive body is formed of a copper-manganese based resistance alloy, the resistance alloy comprising 9.5 to 12.5 mass % of manganese, 2.5 to 5 mass % of tin, 1 to 3 mass % of nickel, and a balance of the resistance alloy being copper, and having a TCR of less than or equal to $-36\times10^{-6}$/K at 100° C. with reference to 25° C.

5. A shunt resistor comprising a resistive body and an electrode, wherein the resistive body is formed of a copper-manganese based resistance alloy, the resistance alloy comprising 9.5 to 12.5 mass % of manganese, 2.5 to 5 mass % of tin, 1 to 3 mass % of nickel, and a balance of the resistance alloy being copper, and having a TCR of less than or equal to $-10\times10^{-6}$/K in a range of 0° C. to 175° C. with reference to 25° C.

* * * * *